US010586989B2

United States Patent
Tokune et al.

(10) Patent No.: US 10,586,989 B2
(45) Date of Patent: Mar. 10, 2020

(54) ELECTRODE MIXTURE LAYER

(71) Applicant: HONDA MOTOR CO., LTD., Minato-Ku, Tokyo (JP)

(72) Inventors: Toshio Tokune, Saitama (JP); Takuya Nishinuma, Saitama (JP); Takahiro Komori, Saitama (JP); Kenshi Inoue, Saitama (JP); Kiyoshi Tanaami, Saitama (JP); Takashi Nakagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 165 days.

(21) Appl. No.: 15/730,912

(22) Filed: Oct. 12, 2017

(65) Prior Publication Data
US 2018/0145333 A1    May 24, 2018

(30) Foreign Application Priority Data

Nov. 22, 2016    (JP) .................................. 2016-227010

(51) Int. Cl.
*H01M 4/66* (2006.01)
*H01M 4/131* (2010.01)
(Continued)

(52) U.S. Cl.
CPC ........... *H01M 4/663* (2013.01); *C01B 32/158* (2017.08); *C01B 32/16* (2017.08); *H01M 4/04* (2013.01);
(Continued)

(58) Field of Classification Search
CPC ...... H01M 4/663; H01M 4/04; H01M 4/8875; H01M 4/76; H01M 4/131; H01M 4/36;
(Continued)

(56) References Cited

U.S. PATENT DOCUMENTS

| 6,495,258 B1 * | 12/2002 | Chen ........................ B32B 5/26 428/408 |
| 7,147,966 B2 * | 12/2006 | Ren ........................ B82Y 10/00 429/209 |

(Continued)

FOREIGN PATENT DOCUMENTS

| JP | 2006244984 A | 9/2006 |
| JP | 2008027912 A | 2/2008 |

(Continued)

OTHER PUBLICATIONS

Machine translation of JP 2013-077426 (no date).*

(Continued)

*Primary Examiner* — Amanda C. Walke
(74) *Attorney, Agent, or Firm* — Carrier Blackman & Associates, P.C.; Joseph P. Carrier; Jeffrey T. Gedeon

(57) ABSTRACT

Provided is an electrode mixture layer capable of reducing internal resistance by use of a carbon nanotube molding. The electrode mixture layer includes an active material and a conductor of carbon nanotubes in close contact with the surface of the active material, and the number density of the carbon nanotubes is 4 tubes/μm or more. The number density is defined as a value obtained by providing measurement lines on a scanning electron microscope image of a surface of the electrode mixture layer at 0.3 μm intervals both longitudinally and laterally, measuring the total number of the carbon nanotubes being in close contact with the surface of the active material and intersecting the measurement lines, and dividing the total number of the carbon nanotubes by the total length of the measurement lines on the active material surface.

4 Claims, 5 Drawing Sheets

1.00 μm

(51) Int. Cl.

| | | |
|---|---|---|
| *C01B 32/158* | (2017.01) | |
| *C01B 32/16* | (2017.01) | |
| *H01M 4/04* | (2006.01) | |
| *H01M 4/36* | (2006.01) | |
| *H01M 4/62* | (2006.01) | |
| *H01M 4/76* | (2006.01) | |
| *H01M 4/88* | (2006.01) | |
| *B82Y 30/00* | (2011.01) | |

(52) U.S. Cl.
    CPC ............ *H01M 4/131* (2013.01); *H01M 4/36* (2013.01); *H01M 4/621* (2013.01); *H01M 4/76* (2013.01); *H01M 4/8875* (2013.01); *B82Y 30/00* (2013.01); *C01B 2202/00* (2013.01); *C01B 2202/20* (2013.01); *C01B 2202/32* (2013.01); *C01B 2202/34* (2013.01); *C01B 2202/36* (2013.01)

(58) Field of Classification Search
    CPC ............ C01B 32/158; C01B 2202/00; C01B 2202/20; C01B 2202/32; C01B 2202/34; C01B 2202/36
    USPC ........................................................ 429/212
    See application file for complete search history.

(56) References Cited

U.S. PATENT DOCUMENTS

| | | | | |
|---|---|---|---|---|
| 7,442,284 B2* | 10/2008 | Ren | ............... | B82Y 10/00 |
| | | | | 204/294 |
| 8,518,472 B2* | 8/2013 | Veerasamy | ........... | C09D 11/52 |
| | | | | 427/58 |
| 9,362,549 B2* | 6/2016 | Rojeski | ............... | H01M 4/386 |
| 9,412,998 B2* | 8/2016 | Rojeski | ............... | H01M 4/131 |
| 9,917,300 B2* | 3/2018 | Rojeski | ............... | H01M 4/366 |
| 2010/0220208 A1* | 9/2010 | Park | ............... | G03B 13/36 |
| | | | | 348/222.1 |
| 2013/0040229 A1* | 2/2013 | Grigorian | ........... | H01M 4/0402 |
| | | | | 429/532 |
| 2014/0113127 A1* | 4/2014 | Tominaga | ............. | H01M 4/583 |
| | | | | 428/323 |
| 2015/0180047 A1* | 6/2015 | Hasegawa | ........... | H01M 4/8882 |
| | | | | 429/530 |
| 2015/0207143 A1* | 7/2015 | Wu | ............... | H01M 4/366 |
| | | | | 429/231.8 |
| 2015/0318550 A1* | 11/2015 | Hashimoto | ............. | H01M 4/13 |
| | | | | 252/511 |
| 2015/0380738 A1* | 12/2015 | Zhou | .................... | H01M 4/621 |
| | | | | 429/223 |
| 2016/0020466 A1* | 1/2016 | Ulbrich | ............... | H01M 4/0404 |
| | | | | 429/217 |
| 2016/0036059 A1 | 2/2016 | Tokune et al. | | |
| 2016/0079006 A1* | 3/2016 | Hosoe | ................... | H01G 11/36 |
| | | | | 429/211 |
| 2016/0359161 A1* | 12/2016 | Nozue | .................... | H01M 4/38 |

FOREIGN PATENT DOCUMENTS

| | | |
|---|---|---|
| JP | 2013077426 A | 4/2013 |
| JP | 2016-031922 A | 3/2016 |

OTHER PUBLICATIONS

Machine translation of JP 2008-027912(no date).*
Machine translation of JP 2006-244984 (no date).*
Office Action Report dated Sep. 17, 2019 issued in corresponding Japanese Patent Application No. 2016-227010.

* cited by examiner 1.00 μm

ELECTRODE MIXTURE LAYER

BACKGROUND OF THE INVENTION

Field of the Invention

The present invention relates to electrode mixture layers.

Description of the Related Art

Use of carbon nanotube moldings for electrodes has been contemplated recently. As such electrodes, for example, an electrode also serving as a current collector in which a particulate active material is included in three-dimensional gaps of a three-dimensional fiber complex constituted by a carbon nanotube molding has been known (e.g., see Japanese Patent Laid-Open No. 2016-31922).

The three-dimensional fiber complex is constituted by integrating three-dimensional carbon nanotube fiber bundle skeletons formed by intersection and assembly of a plurality of carbon nanotubes and a conductor composed of carbon nanotubes. In the electrode also serving as a current collector, the active material is supported by and in close contact with the three-dimensional carbon nanotube fiber bundle skeletons or the conductor composed of carbon nanotubes.

However, an electrode constituted by binding the electrode also serving as a current collector described in Japanese Patent Laid-Open No. 2016-31922 as an electrode mixture layer to a separate current collector disadvantageously has higher internal resistance, in comparison with an electrode constituted by binding an electrode mixture layer composed of a common active material, a conductor, and a binder, to a current collector.

SUMMARY OF THE INVENTION

An object of the present invention is to provide an electrode mixture layer capable of reducing the internal resistance by use of a carbon nanotube molding in order to eliminate such a disadvantage.

In order to achieve such an object, the electrode mixture layer of the present invention is characterized by comprising an active material and a conductor of carbon nanotubes in close contact with a surface of the active material, wherein the number density of the carbon nanotubes in close contact with the surface of the active material is 4 tubes/μm or more.

The number density of the carbon nanotubes in close contact with the surface of the active material herein is defined as a value obtained by providing measurement lines on a scanning electron microscope image of a surface of the electrode mixture layer at 0.3 μm intervals both longitudinally and laterally, measuring a total number of the carbon nanotubes being in close contact with the surface of the active material and intersecting the measurement lines, and dividing the total number of the carbon nanotubes by a total length of the measurement lines on the active material surface.

In the electrode mixture layer of the present invention, setting the number density of the carbon nanotubes in close contact with the surface of the active material to 4 tubes/μm or more increases reaction sites of electrochemical reaction between the active material and the carbon nanotubes. As a result, the electrode mixture layer of the present invention, when bound to a current collector to thereby constitute an electrode, can reduce the internal resistance, in comparison with an electrode constituted by binding an electrode mixture layer comprising a common active material, a conductor, and a binder to a current collector.

Additionally, the electrode mixture layer of the present invention preferably further comprises three-dimensional carbon nanotube fiber bundle skeletons in close contact with the surface of the active material. The three-dimensional carbon nanotube fiber bundle skeletons are formed by intersection and assembly of a plurality of carbon nanotubes.

In this case, the number density of the carbon nanotubes or the three-dimensional carbon nanotube fiber bundle skeletons in close contact with the surface of the active material is 4 tubes/μm or more. The number density of the carbon nanotubes or the three-dimensional carbon nanotube fiber bundle skeletons is defined as a value obtained by providing measurement lines on a scanning electron microscope image of a surface of the electrode mixture layer at 0.3 μm intervals both longitudinally and laterally, measuring the total number of the carbon nanotubes or the three-dimensional carbon nanotube fiber bundle skeletons being in close contact with the surface of the active material and intersecting the measurement lines, and dividing the total number of the carbon nanotubes or the three-dimensional carbon nanotube fiber bundle skeletons by the total length of the measurement lines on the active material surface.

In the electrode mixture layer of the present invention, the carbon nanotubes or the three-dimensional carbon nanotube fiber bundle skeletons preferably have a diameter in a range of 0.8 nm to 2.2 μm.

In order to increase reaction sites of electrochemical reaction in the electrode mixture layer using a carbon nanotube molding, the carbon nanotubes or the three-dimensional carbon nanotube fiber bundle skeletons in close contact with the surface of the active material preferably have a diameter as small as possible. However, in an attempt to allow the carbon nanotubes to have a diameter less than 0.8 nm, synthesis of the carbon nanotubes themselves becomes difficult or their yield becomes markedly reduced.

In contrast, with the diameter of the three-dimensional carbon nanotube fiber bundle skeletons exceeding 2.2 μm, it is not possible to sufficiently reduce the internal resistance when the electrode mixture layer of the present invention is bound to a current collector to thereby constitute an electrode.

The present invention also consists in a battery comprising a positive electrode that comprises a positive electrode-side electrode mixture layer containing a positive electrode active material, and a current collector, a negative electrode that comprises a negative electrode-side electrode mixture layer containing a negative electrode active material, and a current collector, and an electrolyte sandwiched by the positive electrode and the negative electrode, wherein at least one of the positive electrode-side electrode mixture layer and the negative electrode-side electrode mixture layer is the electrode mixture layer of the present invention.

The battery of the present invention, in which at least one of the positive electrode-side electrode mixture layer and the negative electrode-side electrode mixture layer is the electrode mixture layer of the present invention, can reduce the internal resistance and can increase output values and input values.

DETAILED DESCRIPTION OF THE PREFERRED EMBODIMENT

Figure 1:
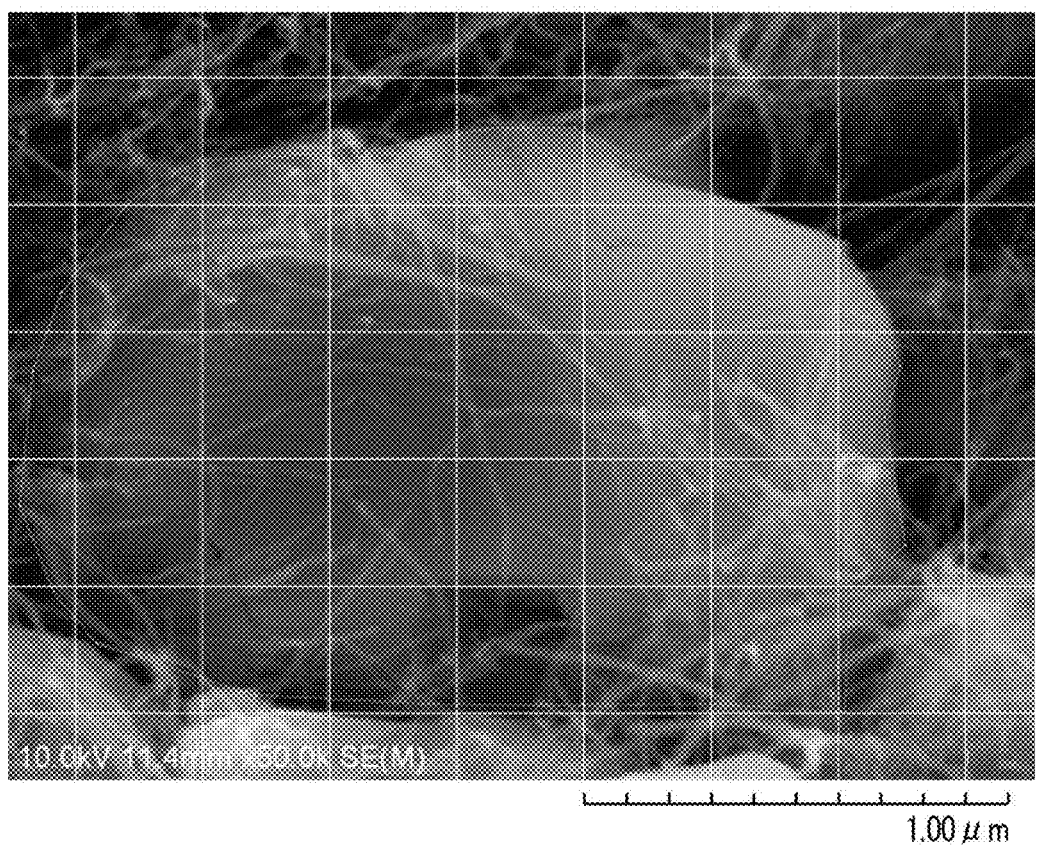
FIG. 1 is a scanning electron micrograph of an electrode mixture layer of Example 1 according to the present invention.

The embodiment of the present invention now will be described in detail with reference to the attached drawings.

The electrode mixture layer of the present embodiment comprises an active material and a conductor of carbon nanotubes or three-dimensional carbon nanotube fiber bundle skeletons in close contact with the surface of the active material, wherein the number density of the carbon nanotubes or the three-dimensional carbon nanotube fiber bundle skeletons in close contact with the surface of the active material is 4 tubes/μm or more. The three-dimensional carbon nanotube fiber bundle skeletons are formed by intersection and assembly of a plurality of carbon nanotubes.

The number density of the carbon nanotubes or the three-dimensional carbon nanotube fiber bundle skeletons is defined as a value obtained by providing measurement lines on a scanning electron microscope image of a surface of the electrode mixture layer at 0.3 μm intervals both longitudinally and laterally, measuring the total number of the carbon nanotubes or the three-dimensional carbon nanotube fiber bundle skeletons being in close contact with the surface of the active material and intersecting the measurement lines, and dividing the total number of the carbon nanotubes or the three-dimensional carbon nanotube fiber bundle skeletons by the total length of the measurement lines on the active material surface.

The electrode mixture layer of the present embodiment can be obtained by placing a dispersion liquid prepared by dispersing a particulate active material and carbon nanotubes having a diameter of 0.8 nm or more in water in a suction filtration device, depositing the active material and the carbon nanotubes on a filter, and separating a deposit from the filter. At this time, a portion of the carbon nanotubes may intersect and assemble to form three-dimensional carbon nanotube fiber bundle skeletons.

Examples and Comparative Examples of the present invention now will be described.

Example 1

In the present example, first, 0.7 mg/ml of carbon nanotubes having a diameter of 0.8 to 1.5 nm and a length of 150 μm (manufactured by Meijo Nano Carbon Co., Ltd., product name: EC-15), 7.1 mg/ml of $Li(Ni_{1/3}Co_{1/3}Mn_{1/3})O_2$ as a positive electrode active material, and 20 mg/ml of dodecyl lithium sulfate as a dispersant were placed in 150 ml of water and treated using an ultrasonic homogenizer at an output of 50 W for 60 minutes to prepare a primary dispersion liquid. In the primary dispersion liquid, the mass ratio between the carbon nanotubes and the positive electrode active material is 9:91.

The primary dispersion liquid was treated five times by a cross flow from a nozzle diameter of 100 μm and at a pressure of 200 MPa using a wet type atomizer NanoVater® manufactured by YOSHIDA KIKAI CO., LTD. to prepare a secondary dispersion liquid.

Next, the secondary dispersion liquid was placed in a suction filtration device to deposit a mixture of the carbon nanotubes and the positive electrode active material on a filter having a pore size of 0.1 μm, and a deposit was provided. The deposit contains three-dimensional carbon nanotube fiber bundle skeletons formed by intersection and assembly of a plurality of carbon nanotubes.

Subsequently, the deposit was separated from the filter to obtain a positive electrode-side electrode mixture layer for a secondary battery (30 mm×40 mm) comprising a conductor of carbon nanotubes and the three-dimensional carbon nanotube fiber bundle skeletons in close contact with the surface of the positive electrode active material. A scanning electron micrograph of the surface of the electrode mixture layer of the present example is shown in FIG. 1.

In the electrode mixture layer of the present example, the number density of the carbon nanotubes or the three-dimensional carbon nanotube fiber bundle skeletons determined from the scanning electron micrograph was 4 tubes/μm. Additionally, in the scanning electron micrograph, the three-dimensional carbon nanotube fiber bundle skeleton having the largest width in close contact with the active material was extracted, and its diameter was taken as the diameter of the three-dimensional carbon nanotube fiber bundle skeletons in the electrode mixture layer of the present example. The diameter of the three-dimensional carbon nanotube fiber bundle skeletons in the electrode mixture layer of the present example was 2.2 μm. The results are shown in Table 1.

Then, the positive electrode-side electrode mixture layer for a secondary battery obtained in the present example was pressed and bonded onto an aluminum current collector manufactured by UACJ Corporation by a roll press at a line pressure of 1500 N/m to form a positive electrode-side electrode.

An artificial graphite negative electrode material manufactured by Showa Denko K.K. (product name: SCMG) and a polyvinylidene fluoride resin (PVDF) as a binder was dispersed in a mass ratio of 95.5:4.5 in a solvent, N-methyl-2-pyrrolidone (NMP) to prepare a slurry for a negative electrode-side electrode mixture layer. The slurry for a negative electrode-side electrode mixture layer was coated onto an electrolytic-copper current collector manufactured by Furukawa Electric Co., Ltd. and dried to form a negative electrode-side electrode.

Subsequently, Hipore manufactured by Asahi Kasei E-materials Corp.®, a polyolefin flat film, thickness: 0.25 μm) was used as a separator. The separator was layered on the positive electrode-side electrode, the negative electrode-side electrode was layered on the separator, and a non-aqueous liquid electrolyte was used to produce a secondary battery. As the non-aqueous liquid electrolyte, a solution prepared by dissolving $LiPF_6$ at a concentration of 1 M in a mixed solution of ethylene carbonate (EC) and diethyl carbonate (DEC) (mass ratio 3:7) was used.

The internal resistance of the secondary battery of the present example was then measured in the following procedure.

First, the secondary battery was left at the measurement temperature (25° C.) for an hour to adjust its charge level (SOC, State of Charge) to 50%. Then, the battery was pulse-discharged for 10 seconds with a C rate (current value (A)/capacity (Ah)) of 0.2, and the voltage at the 10-second discharge was measured. Here, the current value was plotted on the horizontal axis, and the voltage at the 10-second discharge was plotted on the vertical axis.

Next, after left for five minutes, the battery was auxiliary-charged to allow the SOC to recover to 50% and was then left for five minutes. Subsequently, the battery was pulse-discharged for 10 seconds with a C rate set to 0.2, was auxiliary-charged to allow the SOC to recover to 50%, and was then left for five minutes. Subsequently, an operation including setting the C rate to 0.5, 1, 2, 5, and 10, leaving the battery at each C rate for five minutes, auxiliary-charging the battery to allow the SOC to recover to 50%, then leaving the battery for five minutes, pulse-discharging the battery for 10 seconds, auxiliary-charging the battery to allow the SOC to recover to 50%, and then leaving the battery for five minutes was repeated. The current value and voltage at the 10-second discharge at each C rate were plotted.

Then, an approximation straight line of the current value and the voltage at the 10-second discharge was determined, and the slope of the line was taken as the internal resistance. The internal resistance of the secondary battery of the present example was 1.81Ω. The results are shown in Table 1.

Example 2

Figure 2:
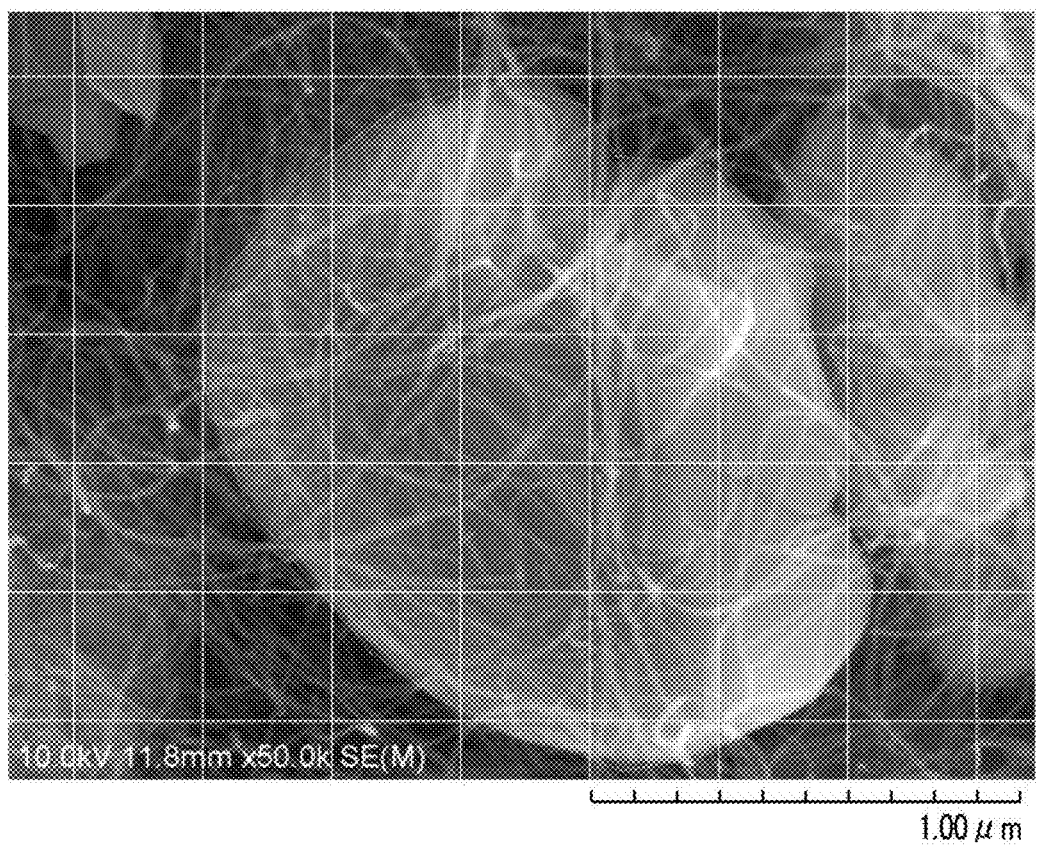
FIG. 2 is a scanning electron micrograph of an electrode mixture layer of Example 2 according to the present invention.

In the present example, except that carbon nanotubes having a diameter of 10 to 50 nm and a length of 100 to 500 μm produced in accordance with the production method described in Japanese Patent Laid-Open No. 2016-031922, paragraph 0053 were used, a positive electrode-side electrode mixture layer for a secondary battery comprising a positive electrode active material and a conductor of carbon nanotubes in close contact with the surface of the positive electrode active material was obtained in the exactly same manner as in Example 1. A scanning electron micrograph of the surface of the electrode mixture layer of the present example is shown in FIG. 2.

In the electrode mixture layer of the present example, the number density of the carbon nanotubes determined from the scanning electron micrograph was 10.2 tubes/μm. The results are shown in Table 1.

Then, a secondary battery was produced in the exactly same manner as in Example 1 except that the electrode mixture layer of the present example was used, and its internal resistance was measured. The internal resistance of the secondary battery of the present example was 1.76Ω. The results are shown in Table 1.

Example 3

Figure 3:
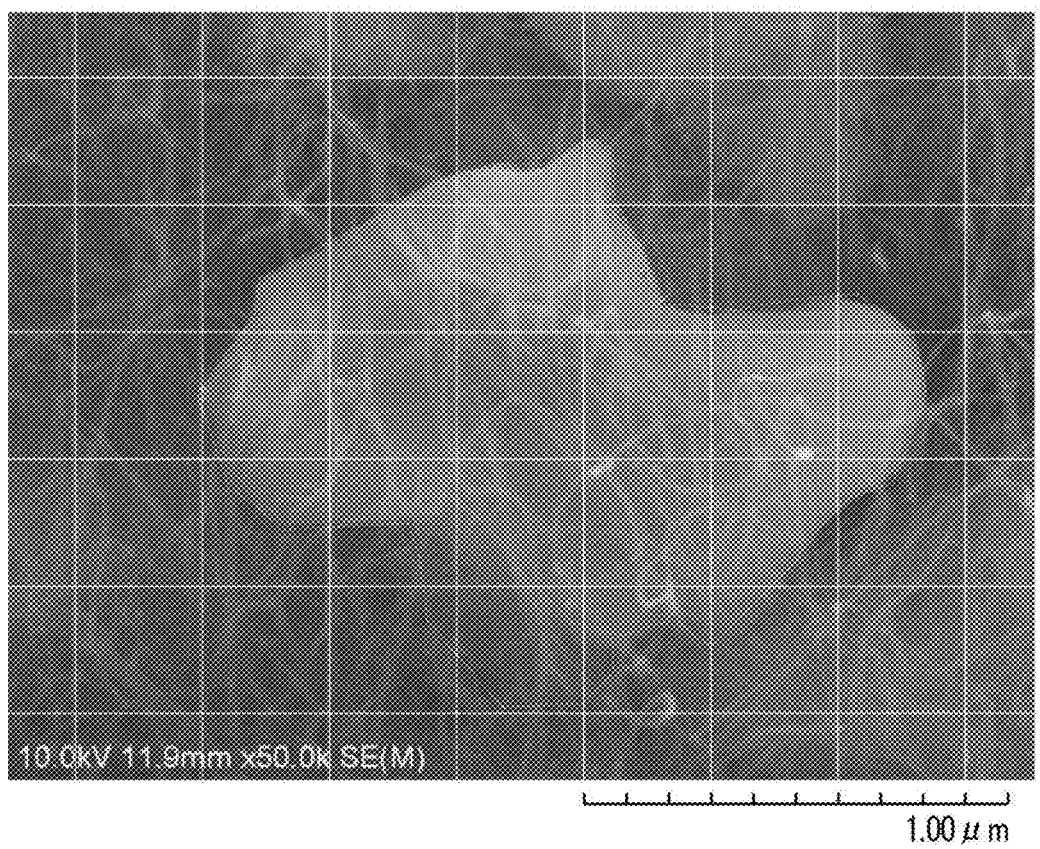
FIG. 3 is a scanning electron micrograph of an electrode mixture layer of Example 3 according to the present invention.

In the present example, except that the carbon nanotubes having a diameter of 8 nm and a length of 200 to 300 μm (manufactured by JEIO Co., Ltd., product name: JENO TUBE 8) were used, a positive electrode-side electrode mixture layer for a secondary battery comprising a positive electrode active material and a conductor of carbon nanotubes in close contact with the surface of the positive electrode active material was obtained in the exactly same manner as in Example 1. A scanning electron micrograph of the surface of the electrode mixture layer of the present example is shown in FIG. 3.

In the electrode mixture layer of the present example, the number density of the carbon nanotubes determined from the scanning electron micrograph was 13.8 tubes/μm. The results are shown in Table 1.

Then, a secondary battery was produced in the exactly same manner as in Example 1 except that the electrode mixture layer of the present example was used, and its internal resistance was measured. The internal resistance of the secondary battery of the present example was 1.53Ω. The results are shown in Table 1.

Example 4

Figure 4:
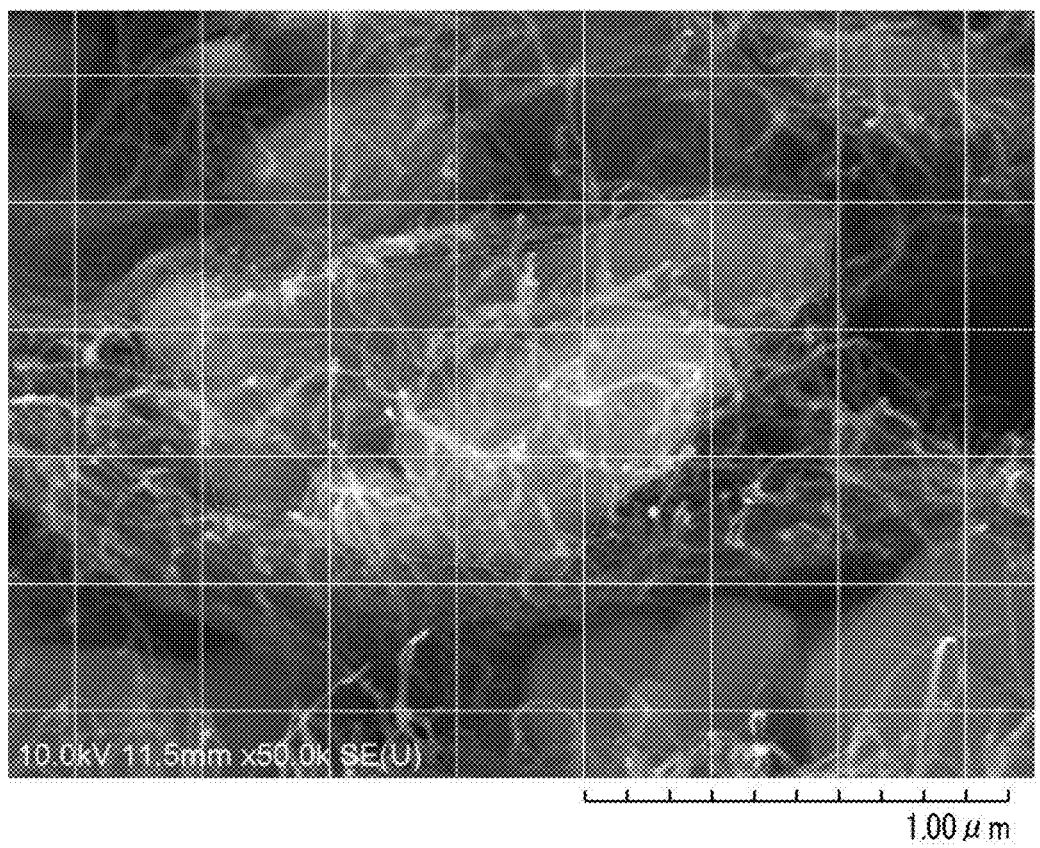
FIG. 4 is a scanning electron micrograph of an electrode mixture layer of Example 4 according to the present invention.

In the present example, except that the carbon nanotubes having a diameter of 9 nm and a length of 750 μm produced in accordance with the production method described in Japanese Patent Laid-Open No. 2016-132594, paragraphs 0032 and 0033 were used, a positive electrode-side electrode mixture layer for a secondary battery comprising a positive electrode active material and a conductor of carbon nanotubes and three-dimensional carbon nanotube fiber bundle skeletons in close contact with the surface of the positive electrode active material was obtained in the exactly same manner as in Example 1. A scanning electron micrograph of the surface of the electrode mixture layer of the present example is shown in FIG. 4.

In the electrode mixture layer in the present example, the number density of the carbon nanotubes or the three-dimensional carbon nanotube fiber bundle skeletons determined from the scanning electron micrograph was 18.8 tubes/μm. Additionally, the diameter of the three-dimensional carbon nanotube fiber bundle skeletons was determined from the scanning electron micrograph in the exactly same manner as in Example 1. The diameter of the three-dimensional carbon nanotube fiber bundle skeletons in the electrode mixture layer of the present example was 0.77 μm. The results are shown in Table 1.

Then, a secondary battery was produced in the exactly same manner as in Example 1 except that the electrode mixture layer of the present example was used, and its internal resistance was measured. The internal resistance of the secondary battery of the present example was 1.27Ω. The results are shown in Table 1.

Example 5

Figure 5:
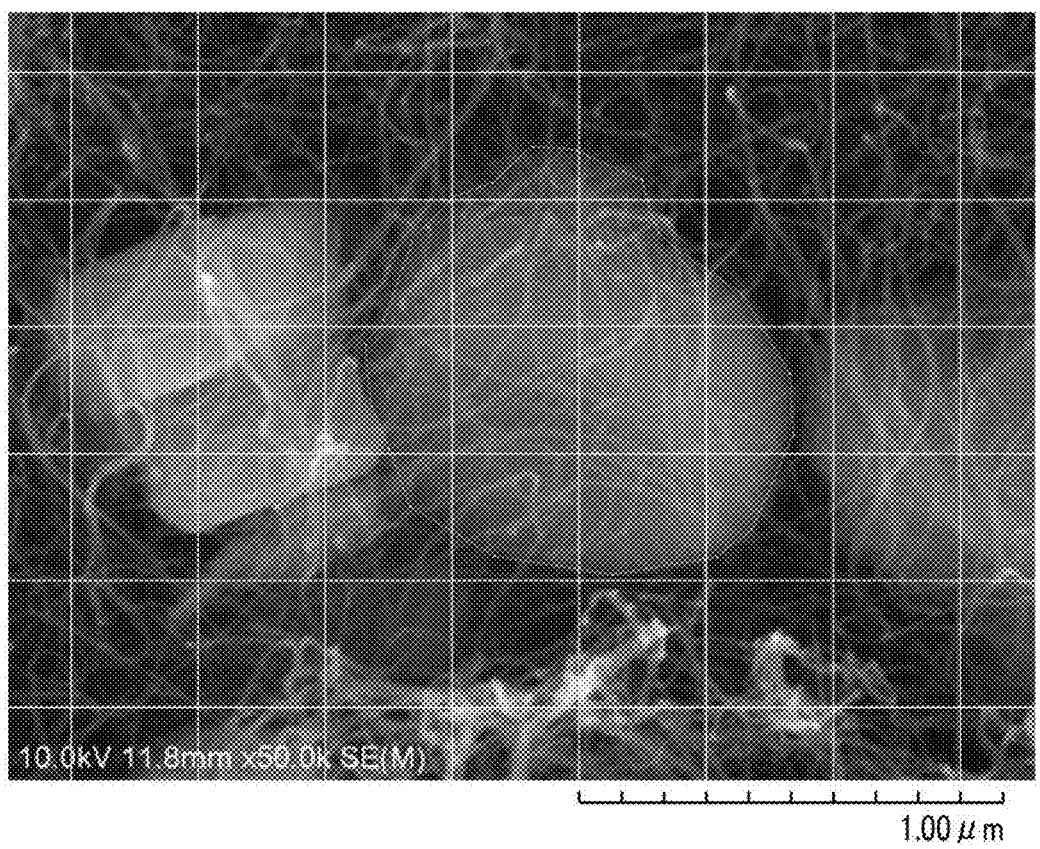
FIG. 5 is a scanning electron micrograph of an electrode mixture layer of Example 5 according to the present invention.

In the present example, except that the carbon nanotubes having a diameter of 9.5 nm and a length of 1.5 μm (manufactured by Nanocyl SA, product name: NC7000) were used, a positive electrode-side electrode mixture layer for a secondary battery comprising a positive electrode active material and a conductor of carbon nanotubes in close contact with the surface of the positive electrode active material was obtained in the exactly same manner as in Example 1. A scanning electron micrograph of the surface of the electrode mixture layer of the present example is shown in FIG. 5.

In the electrode mixture layer of the present example, the number density of the carbon nanotubes determined from the scanning electron micrograph was 26.5 tubes/μm. The results are shown in Table 1.

Then, a secondary battery was produced in the exactly same manner as in Example 1 except that the electrode mixture layer of the present example was used, and its internal resistance was measured. The internal resistance of the secondary battery of the present example was 1.06Ω. The results are shown in Table 1.

COMPARATIVE EXAMPLE

In the present comparative example, $Li(Ni_{1/3}Co_{1/3}Mn_{1/3})O_2$ as a positive electrode active material, carbon black as a conductive assistant, and a polyvinylidene fluoride resin (PVDF) as a binder were dispersed at a mass ratio of 91:4.5:4.5 in a solvent, N-methyl-2-pyrrolidone (NMP), to prepare a slurry for a positive electrode-side electrode mixture layer. The slurry for a positive electrode-side electrode mixture layer was coated onto a current collector manufactured by Toyo Aluminium K.K. and dried to form a positive electrode-side electrode.

Subsequently, a secondary battery was produced in the exactly same manner as in Example 1 except that the positive electrode-side electrode obtained in the present comparative example was used, and its internal resistance was measured. The internal resistance of the secondary battery of the present comparative example was 1.84Ω. The results are shown in Table 1.

TABLE 1

|  | CNT diameter (nm) | CNT length (μm) | CNT fiber bundle diameter (μm) | Number density (tubes/μm) | Internal resistance (Ω) |
|---|---|---|---|---|---|
| Example 1 | 0.8~1.5 | 150 | 2.2 | 4.0 | 1.81 |
| Example 2 | 10~50 | 100~500 | — | 10.2 | 1.76 |
| Example 3 | 8 | 200~300 | — | 13.8 | 1.53 |
| Example 4 | 9 | 750 | 0.77 | 18.8 | 1.27 |
| Example 5 | 9.5 | 1.5 | — | 26.5 | 1.06 |
| Comparative Example | — | — | — | — | 1.84 |

CNT . . . Carbon nanotube
CNT fiber bundle . . . Three-dimensional carbon nanotube fiber bundle skeleton It is clear from Table 1 that the electrode mixture layers of Examples 1 to 5 according to the present invention, when bound to a separate current collector to thereby constitute an electrode, can reduce the internal resistance, in comparison with the electrode mixture layer of Comparative Example constituted by a common active material, a conductor, and a binder.

What is claimed is:

1. An electrode mixture layer comprising:
an active material; and
a conductor of carbon nanotubes in close contact with the surface of the active material,
wherein a number density of the carbon nanotubes in close contact with a surface of the active material is 4 tubes/μm or more,
the number density is defined as a value obtained by providing measurement lines on a scanning electron microscope image of a surface of the electrode mixture layer at 0.3 μm intervals both longitudinally and laterally, measuring a total number of the carbon nanotubes being in close contact with the surface of the active material and intersecting the measurement lines, and dividing the total number of the carbon nanotubes by a total length of the measurement lines on the active material surface,
the electrode mixture layer comprises a three-dimensional carbon nanotube fiber bundle skeletons in close contact with the surface of the active material,
the three-dimensional carbon nanotube fiber bundle skeletons are formed by intersection and assembly of a plurality of carbon nanotubes,
a number density of the carbon nanotubes or the three-dimensional carbon nanotube fiber bundle skeletons in close contact with the surface of the active material is 4 tubes/μm or more, and
the number density is defined as a value obtained by providing measurement lines on a scanning electron microscope image of a surface of the electrode mixture layer at 0.3 μm intervals both longitudinally and laterally, measuring a total number of the carbon nanotubes or the three-dimensional carbon nanotube fiber bundle skeletons being in close contact with the surface of the active material and intersecting the measurement lines, and dividing a total number of the carbon nanotubes or the three-dimensional carbon nanotube fiber bundle skeletons by the total length of the measurement lines on the active material surface.

2. The electrode mixture layer according to claim 1, wherein the carbon nanotubes have a diameter in a range of 0.8 nm to 2.2 μm.

3. The electrode mixture layer according to claim 1, wherein the three-dimensional carbon nanotube fiber bundle skeletons have a diameter in a range of 0.8 nm to 2.2 μm.

4. A battery comprising:
a positive electrode that comprises a positive electrode-side electrode mixture layer containing a positive electrode active material, and a current collector;
a negative electrode that comprises a negative electrode-side electrode mixture layer containing a negative electrode active material, and a current collector; and
an electrolyte sandwiched by the positive electrode and the negative electrode,
wherein at least one of the positive electrode-side electrode mixture layer and the negative electrode-side electrode mixture layer is the electrode mixture layer according to claim 1.

* * * * *